United States Patent [19]

Gagnon

[11] Patent Number: 4,495,613
[45] Date of Patent: Jan. 22, 1985

[54] RECORD REMOVAL AND CENTERING DEVICE FOR 45 R.P.M. DEVICE

[76] Inventor: Bertrand Gagnon, Rangs 2 et 3 ouest, Les Hauteurs, Canada, G0K 1C0

[21] Appl. No.: 613,332

[22] Filed: May 23, 1984

[51] Int. Cl.³ .............................................. G11B 17/04
[52] U.S. Cl. .................................... 369/270; 369/207; 369/289; 369/290; 369/258
[58] Field of Search ............... 369/270, 271, 207, 264, 369/191, 292, 289, 290, 258

[56] References Cited

U.S. PATENT DOCUMENTS

| | | | |
|---|---|---|---|
| 1,464,785 | 8/1923 | Thomson | 369/270 |
| 2,802,670 | 8/1957 | Becton | 369/289 |
| 3,034,795 | 5/1962 | Guest | 369/270 |
| 3,090,626 | 5/1962 | Wadey | 369/258 |
| 3,122,371 | 2/1964 | Staar | 369/207 |
| 3,680,872 | 8/1972 | Hiraki | 369/270 |
| 3,741,567 | 6/1973 | Bis | 369/270 |
| 3,768,815 | 10/1973 | Mathurin | 279/2 R |
| 4,022,478 | 5/1977 | Stewart | 369/270 |
| 4,282,599 | 8/1981 | Lopez | 369/270 |

Primary Examiner—Charles Frankfort
Assistant Examiner—Thomas P. Matecki

[57] ABSTRACT

A device for raising and centering 45 r.p.m. records on a standard turntable having a central spindle. The device fits around the spindle and completely fills the large hole of 45 r.p.m. records. Four radially outwardly extending lifting arms project through corresponding slots made in the cylindrical housing of the device. A vertically displacable circular cap is mounted at the upper portion of the housing and is adapted for manual depression. The internal construction of the cap and housing is arranged to raise the arms and a record lying thereon by lever action when the cap is depressed against the inner portions of the arms.

7 Claims, 6 Drawing Figures

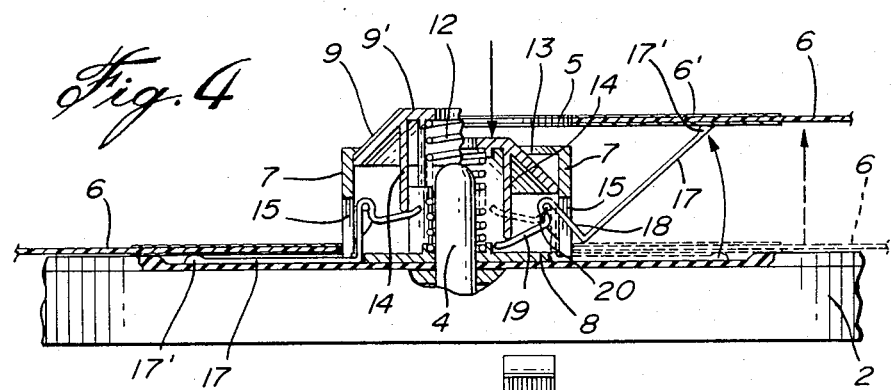
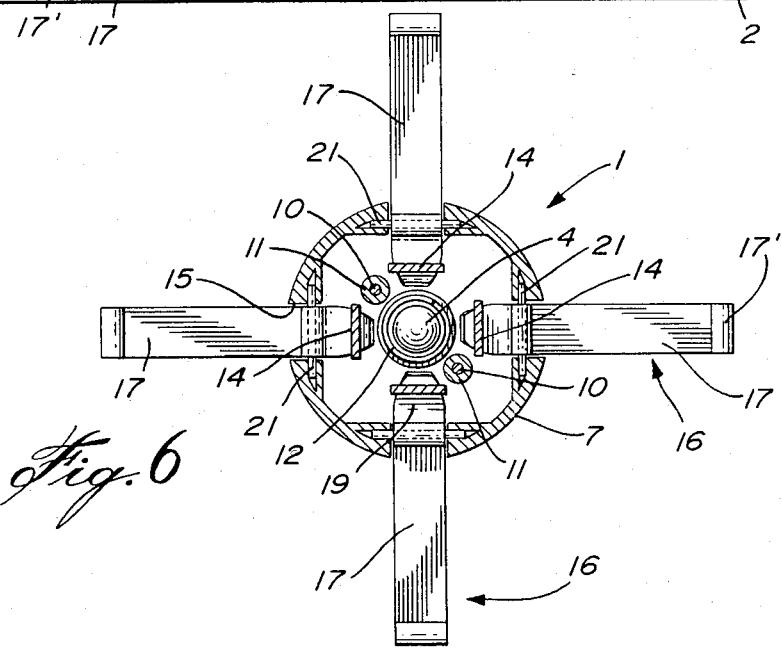
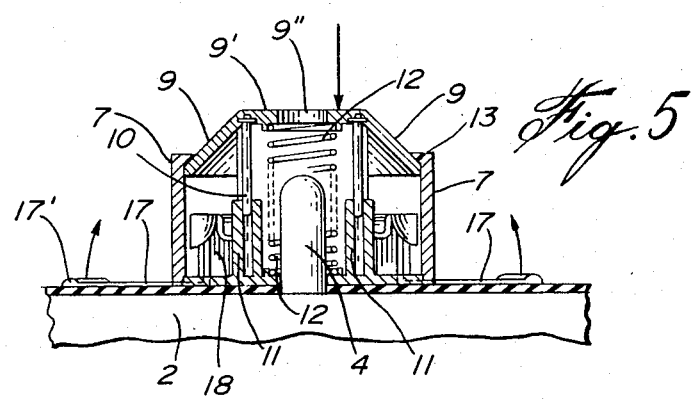

RECORD REMOVAL AND CENTERING DEVICE FOR 45 R.P.M. DEVICE

FIELD OF THE INVENTION

The present invention relates generally to centering disks placed around the spindle of a turntable for large-holed 45 r.p.m. records, more particularly to an improved such device which not only properly centers a 45 r.p.m. record but greatly facilitates the removal of a record from the turntable.

BACKGROUND OF THE INVENTION

Even with the advent of advanced sound-recording systems using electro-magnetic tape "conventional" plastic recordings played on a turntable, including standard 45 r.p.m. recordings, are still very popular. Such records are still manufactured with large center holes so that it is necessary to place a centering disk around the spindle of a turntable or in the center hole itself to play the "45". Such centering disks adequately ensure that the record will not revolve eccentrically but there are also disadvantages. For example, it is difficult to remove the record from the turntable after play unless one has long fingernails and can insert them between the edge of the record and the turntable to remove the record from the latter. Yet, having long fingernails does not make it any easier to remove the record from the turntable without touching the grooved playing surface of the record with one's fingertips, which touching may cause a deterioration in the sound quality, as is known.

OBJECTS OF THE INVENTION

It is therefore the principal object of this invention to provide a centering device for a 45 r.p.m. record which automatically raises the record off its turntable after play by the simple pressing of a finger at the top of the device.

It is also an object of the present invention to provide a device of the character described which is simple in design.

SUMMARY OF THE INVENTION

The above and other objects and advantages are accomplished by a preferred embodiment comprising, in general, a device composed of two parts. The first part is a cylindrical housing having an open top and a bottom surface adapted to rest on the central area of the turntable. The bottom surface is provided with a center hole through which the spindle of the turntable projects upwardly. The diameter of the housing is only slightly less than the diameter of the large central hole of a 45 r.p.m. record, thereby allowing the housing to fill the large hole without any free play, thus centering the record properly relative to the axis of the spindle.

The circular wall of the housing is formed with preferably four mutually-spaced vertical slots, each being rectangular in shape and having its lower edge flush with the bottom surface of the housing.

Each slot has extending therethrough an elongated arm having an outer portion extending straightly and radially outwardly of the housing and an inner portion terminating short of the central axis of the housing. The two portions are vertically spaced by a middle segment.

Each arm is provided with a tangential fulcrum means. The outer external portion of each arm is thus adapted to pivot from a first rest position wherein it lies flush against the central slightly recessed area of the turntable under a record to a raised lift position wherein it is upwardly, outwardly inclined to raise the record away from contact with the turntable. It is then very easy to grasp the record at its outer edge with two hands or at its outer edge and central hole with the fingers of one hand.

The second part of the device consists of a circular cap slidably mounted in the housing for vertical displacement therein and may be provided with a central hole for the spindle. The cap is designed to be pressed from an upper position at the top of the housing to a lower position substantially inside the housing. Biasing means and displacement limit means are provided to keep the cap at its upper position and to prevent it from disengaging upwardly out of the housing, respectively.

Guide means are further provided to obtain smooth vertical displacement of the cap.

The free inner ends of the arms are arranged inside the housing to be pushed downwardly when the cap is depressed thereby raising the outer portions of the arms by lever action.

BRIEF DESCRIPTION OF THE DRAWINGS

The above will be more clearly understood by referring to the preferred embodiment of the invention, illustrated by way of the accompanying drawings, in which:

FIG. 4 is a cross-sectional view taken along lines 4—4 of FIG. 3, the right side of the drawing illustrating an arm in raised position;

FIG. 5 is another cross-sectional view taken along lines 5—5 of FIG. 3; and

FIG. 6 is a horizontally cross-sectioned top plan view of the invention.

Like numerals refer to like elements throughout the drawings.

DETAILED DESCRIPTION OF THE PREFERRED EMBODIMENT

Figure 1:
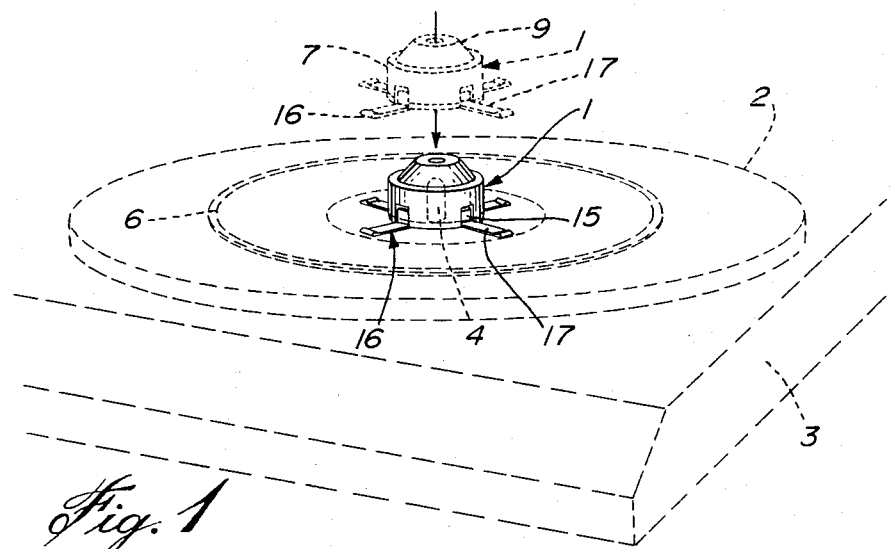
FIG. 1 is a perspective view of the invention placed upon the turntable of a record player shown in dashed outline.
Figure 2:
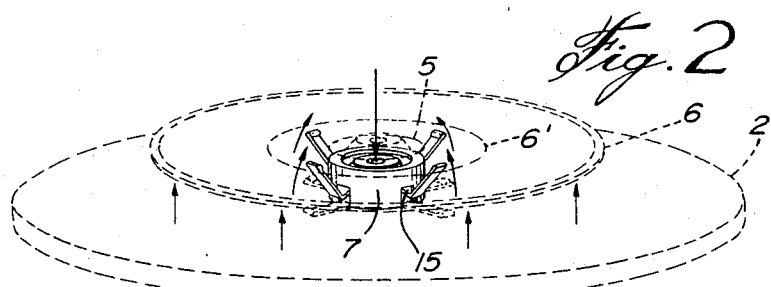
FIG. 2 is a perspective view of the invention wherein the arms are in raised position, also showing a 45 r.p.m. record raised thereby and the turntable in dashed outline.
Figure 3:
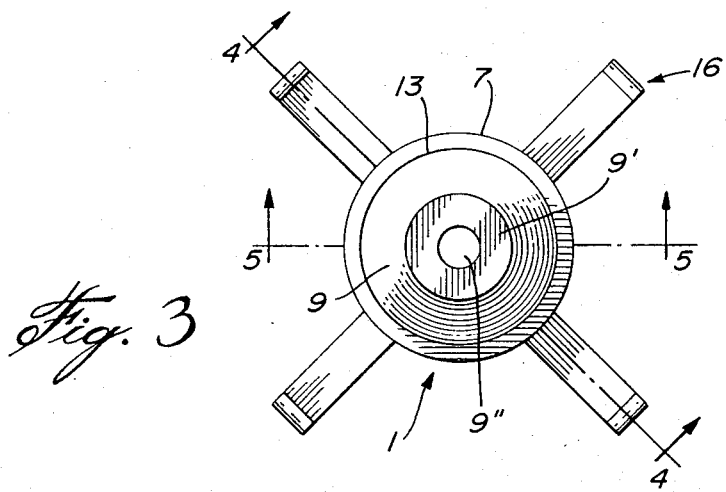
FIG. 3 is a top plan view of the invention.

FIGS. 1 and 2 illustrate how the device 1 is used in position upon the turntable 2 of a record playing machine 3 having a short center spindle 4. As shown, device 1 is placed around the latter and has a diameter corresponding to the diameter of the central hole 5 of a standard 45 r.p.m. record 6.

Device 1 is comprised firstly of a housing 7 which has a cylindrical shape including an open top and a bottom surface or base 8. Base 8 is formed with a central hole adapted to fit closely around spindle 4.

Device 1 further includes a circular cap 9 which is generally of frusto-conical shape wherein the smaller circular surface 9' is topmost, being formed with a central hole 9" adapted to receive the spindle 4, as best seen in FIG. 5. Cap 9 is adapted for vertical displacement, as mentioned above. To this end a guide means is provided, consisting of a pair of verticla guide pins 10 fixed to the upper portion of the cap, each pin 10 being adapted for sliding reciprocal movement in a correspondingly aligned guide cylinder 11 secured to housing 7 at its bottom surface 8.

Biasing means are provided to maintain cap 9 in an upper position, consisting of a helical compression spring 12 abutting the bottom surface 8 of housing 7 and surrounding spindle 4 at its lower end portion, while its upper end abuts the inner side of surface 9'.

Limit means to prevent the cap from disengaging with housing 7 are further provided, consisting of a circular upwardly, inwardly inclined lip 13 made circumferentially at the open top of housing 7.

Cap 9 further includes four rigid elongated tabs 14 secured to the inner side of surface 9' radially outwardly of spring 12 and terminating freely approximately halfway of the height of housing 7. Tabs 14 are equi-spaced and tangential to their respective radial positions, as best seen in FIG. 6.

Housing 7 is formed in its circular side wall with four mutually spaced vertically oriented rectangular slots 15. Each slot 15 has a lower edge flush with the bottom surface of housing 7 and extends upwardly to approximately half the height of the side wall.

An elongated arm, generally designated as 16, is adapted to extend through each slot 15. Arms 16 are preferably formed of a thin slat and include a straight outer portion 17 terminating in a slightly raised outer end 17', an intermediate segment 18 extending at a right angle to portion 17 and an inner portion 19 connected to segment 18 by a loop 20. Inner portion 19 is thus verticlaly spaced above outer portion 17. Loop 20 is engaged over a horizontal pivot pin 21 located tangentially of the side wall of housing 7 adjacent the upper edge of each corresponding slot 15 (cf. FIG. 6). The inner ends of inner portions 19 terminate freely radially outwardly of spring 12 and in vertical registry with elongated tabs 14.

FIGS. 2 and 4 illustrate the functioning of device 1: by pressing downwardly on cap 9 in the direction of the large arrow of FIG. 2 tabs 14 engage and push downwardly on the free ends of inner portions 19 thereby raising outer portions 17 of each arm 16 by lever action with pivots 21 serving as fulcrums. Since outer portions 17 are located under record 6, the latter will be automatically raised.

It is to be noted that arms 16 are of a sufficient length to provide stability while raising record 6, but are also short enough to contact the annular paper label 6' of record 6 thereby avoiding any contact with the record grooves. Also, in raised position, record 6 clears the upper rim of housing 7 (cf. FIG. 4) for easy removal therefrom.

What I claim is:

1. A device for removing and centering at least one 45 r.p.m. record on a standard turntable having a central spindle, comprising: a cylindrical housing having a bottom surface and an open top; said bottom surface having a central hole for precisely receiving said spindle; the external diameter of said housing being slightly less than the diameter of the large central hole of said record; said housing further having at least two equi-spaced, rectangular vertically oriented slots formed in its side wall wherein the lower edges of said slots are flush with said bottom surface; at least two elongated arms extending through said slots; each said arm having an outer straight radially projecting portion and an inner portion terminating radially short of the center of said housing; an intermediate segment joined to both said outer and said inner portions; fulcrum means between said intermediate segment and said inner portion; the latter being vertically spaced relative to said outer portion; further comprising a circular cap slidably mounted in said housing for vertical displacement therein; biasing, displaccment limiting and guide means for said cap; the inner ends of said inner portions of said arms being arranged to raise said outer portions of said arms upwardly by lever action when said cap is pressed manually downwardly.

2. The device of claim 1, wherein there are four equi-spaced slots, four corresponding arms and said cap is of a frusto-conical shape.

3. The device of claim 2, wherein said intermediate segment extends upwardly at a right angle to said outer portion and has a loop at its upper end joined to said inner portion, whereby the latter is upwardly spaced from said outer portion; said fulcrum means consisting of a tangential pivot pin engaged under ssid loop and located adjacent the upper edge of its associated said slot.

4. The device of claim 3, wherein said cap is provided with four vertical elongated tabs fixed to the upper portion of the cap and projecting downwardly therefrom, being vertically aligned with said inner ends of said inner portions and adapted to push downwardly on said inner ends when said cap is depressed.

5. The device of claim 1, wherein said biasing means consists of a compression spring abutting said bottom surface around said spindle and abutting the underside of the top surface of said cap.

6. The device of claim 2, wherein said limiting means includes a circular upwardly, inwardly inclined lip at said open top of said housing.

7. The device of claim 2, wherein said guide means consists of a pair of vertical guide pins fixed to the upper portion of said cap at their upper ends; each said guide pin being adapted for reciprocal sliding movement in a correspondingly aligned guide cylinder secured at its lower end to said bottom surface.

* * * * *